Figure 1:
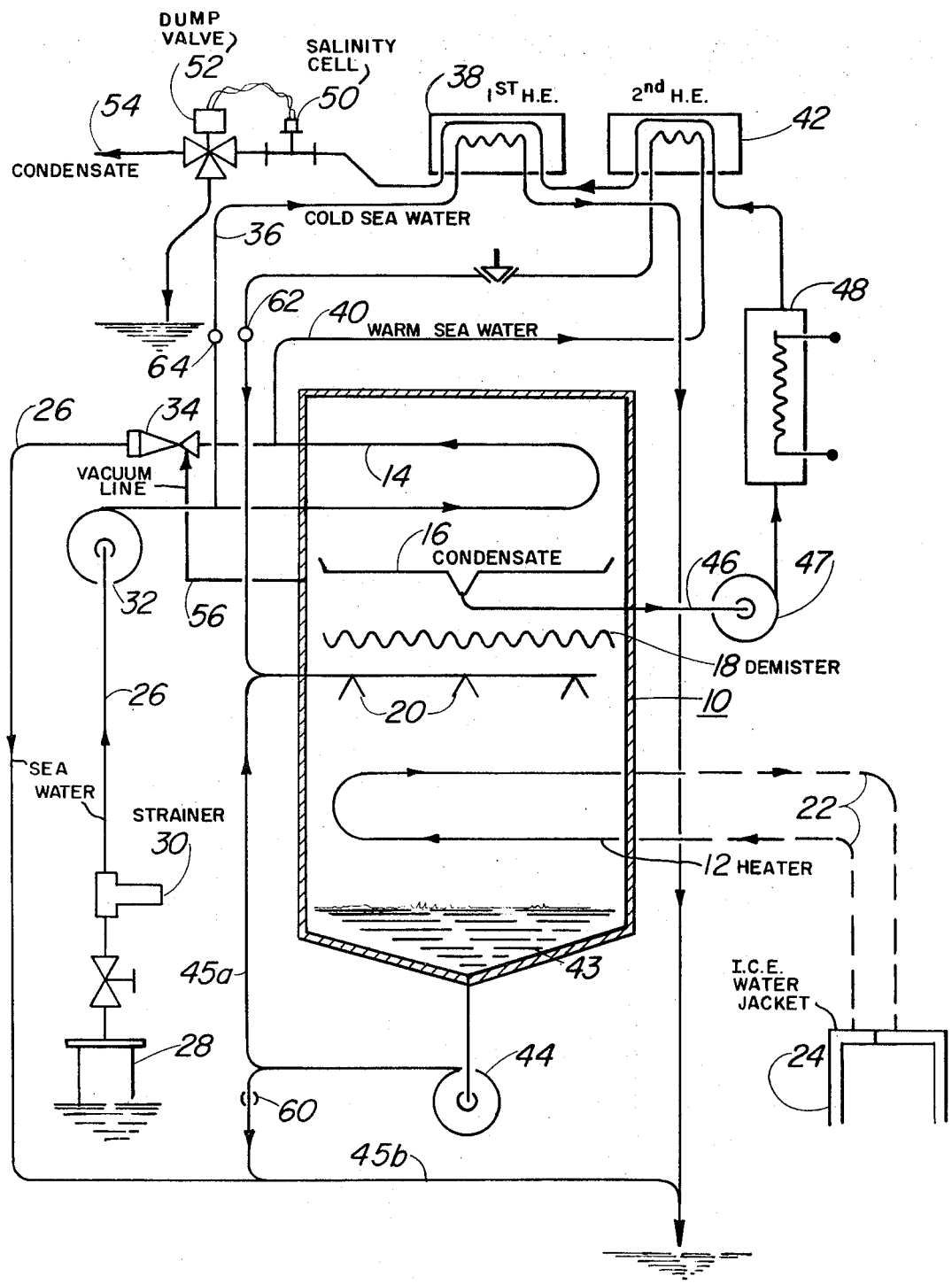

United States Patent
Arnold

[11] 3,864,215
[45] Feb. 4, 1975

[54] METHOD OF DISTILLING SEA WATER ON SMALL SHIPS AND MARINE PLATFORMS HAVING INTERNAL COMBUSTION ENGINE

[76] Inventor: Alanson J. Arnold, 16 Bluebird St., New Orleans, La. 70124

[22] Filed: Feb. 11, 1974

[21] Appl. No.: 441,077

[52] U.S. Cl. .................. 203/11, 202/180, 202/195, 202/185, 203/89, 203/90, 159/13 B, 159/48 R
[51] Int. Cl. ....... B01d 1/22, B01d 3/00, B01d 3/08, B01d 3/10
[58] Field of Search .... 159/13 R, 24 A, 24 B, 13 B; 202/180, 185, 195, 176, 236, 177; 203/10, 11, 89, 90

[56] References Cited
UNITED STATES PATENTS

| | | | |
|---|---|---|---|
| 1,379,502 | 5/1921 | Woern | 202/236 |
| 2,280,093 | 4/1942 | Kleinschmidt | 159/24 R X |
| 2,378,350 | 6/1945 | Worthen et al. | 203/11 U X |
| 2,389,064 | 11/1945 | Latham, Jr. | 203/10 X |
| 2,389,789 | 11/1945 | Latham, Jr. | 203/10 X |
| 2,515,013 | 7/1950 | Kruhmin | 202/180 |
| 2,537,259 | 1/1951 | Cleaver et al. | 203/10 X |
| 2,637,684 | 5/1953 | Buffum | 159/24 R X |
| 3,248,305 | 4/1966 | Williamson | 203/11 X |
| 3,351,120 | 11/1967 | Goeldner | 203/11 X |
| 3,395,084 | 7/1968 | Loebel et al. | 159/13 B X |

Primary Examiner—Jack Sofer
Attorney, Agent, or Firm—James B. Lake, Jr.

[57] ABSTRACT

Vaporization and condensation are carried on in a closed chamber at pressures reduced to permit flash vaporization at temperatures available from water jacket of internal combustion main engine. Heating tubes are mounted adjacent the bottom of the closed chamber and connected to the water jacket. Condenser tubes are mounted in the top of the closed chamber and connected to cool circulating sea water. Spray nozzles are mounted above said heater tubes and connected with a supply of sea water heated by means hereinbelow described. A demister, defining a grid of vapor passageways, is mounted above the spray nozzles for detraining sea water droplets carried upward by vapor rising from the heater tubes. A collector for condensate is secured below the condenser tubes and connected to an exterior condensate line. Pressure in the closed chamber is reduced by connecting it to a low pressure area of a venturi installed in a cool sea water circulating line to the condenser tubes. A first branch of this sea water circulating line goes to a first heat exchanger that is also connected in the exterior condensate line for cooling the condensate. A second branch carries sea water, warmed by heat of condensation absorbed in the condenser tubes, to be further preheated by hot condensate which in turn is cooled in a second heat exchanger also connected in the condensate line ahead of said first heat exchanger. The preheated sea water is utilized by feeding to the spray nozzles for spraying on said heater tubes for flash vaporization of part and recirculation of the rest back to the spray nozzles and overboard. The exterior condensate line includes a pasturizer, said first and second heat exchangers, a salinity cell for testing the condensate, and a dump valve activated by said salinity cell for alternatively directing the condensate to storage and overboard in accordance with its salinity.

3 Claims, 1 Drawing Figure

METHOD OF DISTILLING SEA WATER ON SMALL SHIPS AND MARINE PLATFORMS HAVING INTERNAL COMBUSTION ENGINE

The invention relates generally to water distilling apparatus and methods, and more particularly to distilling salt water on small ships having internal combustion engines for power.

The art of distilling salt water on large ocean going vessels with steam driven main engines and with an abundance of steam available is well known. However on small ships with internal combustion main engines only water at about 165°F. is available from the engine water jackets, and there is a problem of obtaining fresh water at sea.

It is an object of the invention to provide a method and apparatus for small ships with internal combustion engines to distill fresh water from salt water at sea, and for marine platforms to do likewise.

Another object of the invention is to provide similarly for marine platforms and such other installations that are dependent for energy on watercooled internal combustion engines.

Other objects and a more complete understanding of the invention may be had by referring to the following description, claims and drawings, in which:

FIG. 1 is a combination black and schematic diagram showing the parts and their arrangement in the invention.

The invention comprises a closed chamber 10 in which are mounted heater tubes 12 adjacent the bottom, condenser tubes 14 adjacent the top, and therebetween in order from top to bottom, a collector 16, a demister 18, and connected spray nozzles 20 directed toward heater tubes 12 adjacent thereto. The interior constituents of the closed chamber are supplied with appropriate liquids from hydraulic lines having their own sources of hydraulic pressure. Thus heater lines 22 connects engine water jacket 24 to heater tubes 12 for the circulation of hot water at about 180°F. therebetween by means of the main engine circulating water pumps (not shown). Sea water lines 26 connect condenser tubes 14 to the sea through a sea chest 28, a strainer 30, a circulating pump 32 on the inlet side of the condenser tubes, and a venturi 34 on the outlet side. A branch cool line 36 goes from the inlet side of line 26 to a first heat exchanger 38 and then overboard for a second stage cooling of condensate. Another branch warm line 40 goes from the outlet side of line 26 to a second heat exchanger 42 for a first stage condensate cooling and a second stage sea water heating. The preheated sea water then goes to spray nozzles 20 for spraying over heater tubes 12. Part of the spray flash vaporizes to pass through the demister, detraining salt water globules and condensing on condenser tubes 14 to fall into condensate collector 16. The unvaporized part of the spray falls to the bottom of the closed chamber and is recirculated by a pump 44 back to the sprays and to overboard.

In operation the invention draws sea water from sea chest 28 through strainer 30 by means of pump 32, all connected by hydraulic lines 26 to condenser tubes 14 and through venturi 34 back to sea. A low pressure area of venturi 34 is connected to closed chamber 10 by line 56 to draw a vacuum in said closed chamber sufficient to flash vaporize sea water at 165°F. Part of the sea water from the outlet side of the condenser tubes 14 goes through branch line 40 to heat exchanger 42 where it is heated by means described below and then goes to interconnected spray nozzles 20 where it is sprayed over heater tubes 12. Water jacket 24 of the internal combustion main engines is connected with heater tubes 12 and hot water from the water jacket heats these tubes to about 165°F.

When heated sea water from heat exchanger 42 is sprayed over the heater tubes, part of the spray is flash vaporized to rise through demister 18 which detrains salt water globules caught in the updraft of the rising vapor, and to contact condenser tubes 14. The vapor condenses on the tubes and drips down into collector 16. If the outer surface of the condenser tubes are roughened condensation is facilitated. Pump 47 draws off the hot condensate from the collector through line 46 to a pasteurizer 48 for meeting Public Health requirements for drinking water. The hot pasteurized condensate then goes to second heat exchanger 42 where it gives up heat to warmed sea water for spraying as described heretofore. The partially cooled condensate then goes to first heat exchanger 38 for cooling by sea water through branch line 36. The now cool condensate is tested in a salinity cell 50 which operates a dump valve 52 in accordance with salinity test to send the cool condensate to storage 54 or overboard.

What is claimed is:

1. Improved method of distilling fresh water from sea water on marine structures with internal combustion main engines, comprising the steps of: circulating hot water from water-jacketed main engines to heater tubes mounted in a closed chamber; circulating cold sea water to provide condensive cooling through condenser tubes mounted in said closed chamber above said heater tubes and above the liquid level therein, and through a first heat exchanger mounted adjacent said closed chamber to provide cooling therein; circulating a portion of the sea water warmed from said condenser tubes to a second heat exchanger for further heating to circulate as sea water for evaporation; Creating a vacuum in said closed chamber with a venturi through which flows the remaining portion of said sea water warmed in said condenser tubes which is then wasted by connecting a low pressure area of said venturi to the vapor space of said closed chamber, said vacuum being at least sufficiently high to flash vaporize sea water at slightly below the temperature of said circulating hot water from water-jacketed main engines; spraying heated sea water from said second heat exchanger over said heater tubes to flash vaporize part into rising vapor and the remainder falling to bottom of the closed chamber; pumping said remainder partially back to said spraying and partially overboard; condensing said rising vapor on said condenser tubes as condensate dripping therefrom; catching said condensate in a collector means mounted below said condenser tubes; Pasteurizing said condensate in a heater; simultaneously cooling said hot pasteurized condensate and heating said warmed sea water in said second heat exchanger; further cooling said condensate with cool sea water in said first heat exchanger; and testing salimity of condensate in a salinity cell for acceptance or rejection.

2. Improved method of distilling fresh water as described in claim 1 wherein said condenser tubes are exteriorly roughened to facilitate condensation.

3. Improved method of distilling fresh water as described in claim 1 wherein detraining salt water globules in said vapor is accomplished in a demister prior to condensing said vapor.

* * * * *